(12) United States Patent
Harmon et al.

(10) Patent No.: US 8,520,232 B2
(45) Date of Patent: Aug. 27, 2013

(54) PRINT JOB ANALYZING METHOD AND APPARATUS WITH PRINT DEVICE RECOMMENDATION FUNCTIONS

(75) Inventors: Geoff W. Harmon, Mission Viejo, CA (US); Toshiro Fujimori, Laguna Beach, CA (US); Rakesh Pandit, Irvine, CA (US); Shigenori Matsubara, Irvine, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1353 days.

(21) Appl. No.: 11/395,520

(22) Filed: Mar. 31, 2006

(65) Prior Publication Data
US 2007/0229880 A1 Oct. 4, 2007

(51) Int. Cl.
*G06F 3/12* (2006.01)
(52) U.S. Cl.
USPC ........................................................ 358/1.15
(58) Field of Classification Search
USPC ................... 358/1.15, 1.13, 1.12, 1.1
See application file for complete search history.

(56) References Cited

U.S. PATENT DOCUMENTS

| | | | |
|---|---|---|---|
| 5,559,933 A | 9/1996 | Boswell | |
| 5,580,177 A | 12/1996 | Gase et al. | |
| 5,727,135 A * | 3/1998 | Webb et al. | 358/1.14 |
| 5,771,800 A | 6/1998 | Inamine et al. | |
| 6,498,656 B1 | 12/2002 | Mastie et al. | |
| 6,592,275 B1 | 7/2003 | Aihara et al. | |
| 6,667,810 B1 | 12/2003 | Jeyachandran et al. | |
| 6,762,852 B1 * | 7/2004 | Fischer | 358/1.15 |
| 6,930,795 B1 * | 8/2005 | Motamed et al. | 358/1.18 |
| 6,943,905 B2 | 9/2005 | Ferlitsch | |
| 6,962,449 B2 | 11/2005 | Lermant et al. | |
| 6,974,269 B2 | 12/2005 | Lermant et al. | |
| 7,102,773 B1 | 9/2006 | Oosterhout et al. | |
| 7,346,673 B1 | 3/2008 | Oda | |
| 7,359,076 B2 | 4/2008 | Uchino | |
| 7,821,657 B2 | 10/2010 | Ferlitsch | |
| 2002/0026379 A1 | 2/2002 | Chiarabini et al. | |
| 2002/0041395 A1 | 4/2002 | Kimura | |
| 2002/0042797 A1 | 4/2002 | Kimura | |
| 2002/0135792 A1 * | 9/2002 | Sommer et al. | 358/1.13 |
| 2002/0196460 A1 | 12/2002 | Parry | |

(Continued)

FOREIGN PATENT DOCUMENTS

| | | |
|---|---|---|
| JP | 7-281979 | 10/1995 |
| JP | 09-305337 | 11/1997 |

(Continued)

OTHER PUBLICATIONS

Japanese Office Action, dated Aug. 30, 2011, in a counterpart Japanese patent application, No. JP 2007-090224.

(Continued)

*Primary Examiner* — Jeremiah Bryar
(74) *Attorney, Agent, or Firm* — Chen Yoshimura LLP

(57) ABSTRACT

A useful method for analyzing a print job in a multiple-printer environment is provided. The method includes receiving a print job, the print job specifying values of job parameters, reading out values of the job parameters specified in the print job, determining whether the printer settings of the plurality of printers conform to said read out values of the job parameters of the print job, and communicating a result of the conformity determination to a user.

9 Claims, 12 Drawing Sheets

(56) References Cited

U.S. PATENT DOCUMENTS

| | | |
|---|---|---|
| 2003/0007819 A1 | 1/2003 | Wanda |
| 2003/0011812 A1 | 1/2003 | Sesek et al. |
| 2003/0103235 A1 | 6/2003 | Gomi |
| 2003/0144946 A1 | 7/2003 | Misawa et al. |
| 2003/0184799 A1 | 10/2003 | Ferlitsch |
| 2004/0105122 A1 | 6/2004 | Schaeffer |
| 2004/0136030 A1 | 7/2004 | Gassho |
| 2004/0145768 A1* | 7/2004 | Stringham ............ 358/1.14 |
| 2004/0145772 A1 | 7/2004 | Stringham |
| 2004/0179230 A1 | 9/2004 | Kitada et al. |
| 2004/0196482 A1 | 10/2004 | Kurita |
| 2005/0162667 A1 | 7/2005 | Felix et al. |
| 2005/0180791 A1 | 8/2005 | Kujirai |
| 2005/0286944 A1 | 12/2005 | Kanamoto et al. |
| 2006/0031585 A1 | 2/2006 | Nielsen et al. |
| 2006/0044594 A1 | 3/2006 | Shirai |
| 2006/0050294 A1 | 3/2006 | Smith et al. |
| 2006/0114490 A1 | 6/2006 | Rolleston |
| 2006/0114497 A1 | 6/2006 | Anderson et al. |
| 2007/0091346 A1 | 4/2007 | Ogura et al. |
| 2007/0103719 A1* | 5/2007 | Azuchi ............... 358/1.15 |
| 2007/0229879 A1 | 10/2007 | Harmon et al. |
| 2007/0229880 A1 | 10/2007 | Harmon et al. |
| 2007/0229896 A1 | 10/2007 | Fujimori et al. |
| 2007/0236725 A1 | 10/2007 | Harmon et al. |
| 2008/0030772 A1 | 2/2008 | Shirai |
| 2008/0106762 A1 | 5/2008 | Mullender et al. |
| 2010/0188700 A1 | 7/2010 | Fujimori et al. |

FOREIGN PATENT DOCUMENTS

| | | |
|---|---|---|
| JP | 10-187400 | 7/1998 |
| JP | 10-320341 | 12/1998 |
| JP | 10-320342 | 12/1998 |
| JP | 10-333844 | 12/1998 |
| JP | 1999-095940 | 4/1999 |
| JP | 11-277852 | 10/1999 |
| JP | 11-282643 | 10/1999 |
| JP | 2000-010741 | 1/2000 |
| JP | 2000-181641 | 6/2000 |
| JP | 2000-242453 | 9/2000 |
| JP | 2000-293465 | 10/2000 |
| JP | 2001-75755 | 3/2001 |
| JP | 2001-075768 | 3/2001 |
| JP | 2001-256013 | 9/2001 |
| JP | 2002-11923 | 1/2002 |
| JP | 2002-171378 | 6/2002 |
| JP | 2002-278710 | 9/2002 |
| JP | 2002-366326 | 12/2002 |
| JP | 2003-162351 | 6/2003 |
| JP | 2003-251898 | 9/2003 |
| JP | 2003-266882 | 9/2003 |
| JP | 2003-316535 | 11/2003 |
| JP | 2004-72247 | 3/2004 |
| JP | 2004-213393 | 7/2004 |
| JP | 2006-21358 | 1/2006 |
| JP | 2007-272901 | 10/2007 |
| JP | 2008-152759 | 7/2008 |

OTHER PUBLICATIONS

Japanese Office Action, dated Aug. 30, 2011, in related Japanese patent application, No. JP 2007-090221.

Japanese Office Action, dated Aug. 30, 2011, in related Japanese patent application, No. JP 2007-090233.

Japanese Office Action, dated Apr. 3, 2012, in related Japanese patent application, No. JP 2007-090221.

Japanese Office Action, dated Nov. 6, 2012 in a counterpart Japanese patent application, No. 2009-208614.

Japanese Office Action, dated Feb. 5, 2013, in a related Japanese patent application, No. JP 2011-260990.

Japanese Office Action, dated Mar. 26, 2013 in related Japanese patent application, No. 2009-208614.

* cited by examiner

PRINT JOB ANALYZING METHOD AND APPARATUS WITH PRINT DEVICE RECOMMENDATION FUNCTIONS

This application cross-references and incorporates by reference the following U.S. patent applications in their entireties:

1. U.S. patent application Ser No. 11/394,526, filed on Mar. 31, 2006, entitled "PRINT JOB MANAGEMENT METHOD AND APPARATUS WITH GROUPING FUNCTION" by Geoff W. HARMAN, Toshiro FUJIMORI, Rakesh PANDIT, and Shigenori MATSUBARA.

2. U.S. patent application Ser. No. 11/395,519, filed on Mar. 31, 2006, entitled "PRINT MANAGEMENT METHOD AND APPARATUS WITH DESTINATION PANEL" by Geoff W. HARMAN, Toshiro FUJIMORI, Rakesh PANDIT, and Shigenori MATSUBARA.

3. U.S. patent application Ser. No. 11/395,584, filed on Mar. 31, 2006, entitled "PRINT MANAGEMENT METHOD AND APPARATUS WITH MULTIPLE VIEWS" by Toshiro FUJIMORI, Geoff W. HARMAN, Rakesh PANDIT, and Shigenori MATSUBARA.

BACKGROUND OF THE INVENTION

1. Field of the Invention

This invention relates to print job analyzing method and apparatus, and more particularly, to print job analyzing method and apparatus using multiple printers.

2. Description of Related Art

In an environment that processes a large number of print jobs with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application. Typically, each printing job specifies a source file that electrically contains a document to be printed, the size, color and the type of the paper on which the document should be printed, the printing resolution, duplex or single-side printing, and certain finishing conditions, such as book, staple, collate printing, etc., depending on a print job requester's needs. In order to process a large volume of print jobs that each differ in terms of these job parameters, a print shop utilizes multiple commercial grade printers. Typically, one or more black & white (B&W) printers are in operation to process B&W printing. Color printers are also installed to handle color printing. Each of these printers, however, has limitations on available printer settings, such as the paper size, the paper type, resolution settings, etc. When a large volume of printing jobs is to be handled with multiple B&W and color printers, it is a daunting task to assign each printing job to an appropriate printer.

SUMMARY OF THE INVENTION

Accordingly, the present invention is directed to a print job analyzing method and apparatus that substantially obviates one or more of the problems due to limitations and disadvantages of the related art.

An object of the present invention is to provide an improved print job analyzing method and apparatus.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a method for analyzing a print job, implemented in a print job management apparatus connected to a plurality of printers, each of the plurality of printers having printer settings, the method including receiving a print job, the print job specifying values of job parameters, reading out values of the job parameters specified in the print job, determining whether the printer settings of the plurality of printers conform to said read out values of the job parameters of the print job, and communicating a result of the conformity determination to a user.

In another aspect, the present invention provides a method for analyzing a print job, implemented in a print job management apparatus connected to a plurality of printers, each of the plurality of printers having one or more input paper trays for storing paper of a particular size, type, and color, each paper tray being associated with available finishing options that can be performed by the corresponding printer, the method including defining printers and one or more combinations of the printers as available print processing options, receiving a print job, the print job specifying one or more sets of job parameters including a paper size, a paper type, a paper color and finishing options, analyzing said one or more sets of job parameters specified in the print job and each of the print processing options to determine whether any of the print processing options match the print job with respect to the paper size, the paper type, the paper color and the finishing options, and communicating a result of the analysis to a user In another aspect, the present invention provides a computer program product including a computer usable medium having a computer readable code embodied therein for controlling a data processing apparatus connected to a plurality of printers, each of the plurality of printers having printer settings, the computer readable program code being configured to cause the data processing apparatus to execute a process for analyzing a plurality of print jobs, the process including receiving a print job, the print job specifying values of job parameters, reading out values of the job parameters specified in the print job, determining whether the printer settings of the plurality of printers conform to said read out values of the job parameters of the print job, and communicating a result of the conformity determination to a user.

In another aspect, the present invention provides a computer program product comprising a computer usable medium having a computer readable code embodied therein for controlling a data processing apparatus connected to a plurality of printers, each of the plurality of printers having one or more input paper trays for storing paper of a particular size, type, and color, each paper tray being associated with available finishing options that can be performed by the corresponding printer, the computer readable program code being configured to cause the data processing apparatus to execute a process for analyzing a plurality of print jobs, the process including defining printers and one or more combinations of the printers as available print processing options, receiving a print job, the print job specifying one or more sets of job parameters including a paper size, a paper type, a paper color and finishing options, analyzing said one or more sets of job parameters specified in the print job and each of the print processing options to determine whether any of the print processing options match the print job with respect to the paper size, the paper type, the paper color and the finishing options, and visually communicating a result of the analysis to a user.

In another aspect, the present invention provides a print job analyzing apparatus configured to be connected to a plurality of printers each of the plurality of printers having printer settings, the print job analyzing apparatus including a data processor communicating with a graphic user interface, the data processor receiving a print job; the print job specifying values of job parameters, the data processing reading out values of the job parameters specified in the print job, and determining whether the printer settings of the plurality of printers conform to said read out values of the job parameters of the print job, the data processing causing the graphic user interface to communicate a result of the conformity determination to the user.

It is to be understood that both the foregoing general description and the following detailed description are exemplary and explanatory, and are intended to provide further explanation of the invention as claimed.

BRIEF DESCRIPTION OF THE DRAWINGS

FIG. 2 schematically illustrates a Main Screen that appears on a display panel of a print job management apparatus according to an embodiment of the present invention.

FIG. 6 schematically illustrates an In Box Panel screen according to an embodiment of the present invention.

FIG. 10 schematically illustrates an example of a Queue Panel for a specified print job according to an embodiment of the present invention.

FIG. 11 schematically illustrates an example of a View Recommends Panel according to an embodiment of the present invention.

FIG. 12 schematically illustrates another example of a View Recommends Panel according to an embodiment of the present invention.

DETAILED DESCRIPTION OF THE PREFERRED EMBODIMENTS

Figure 1:
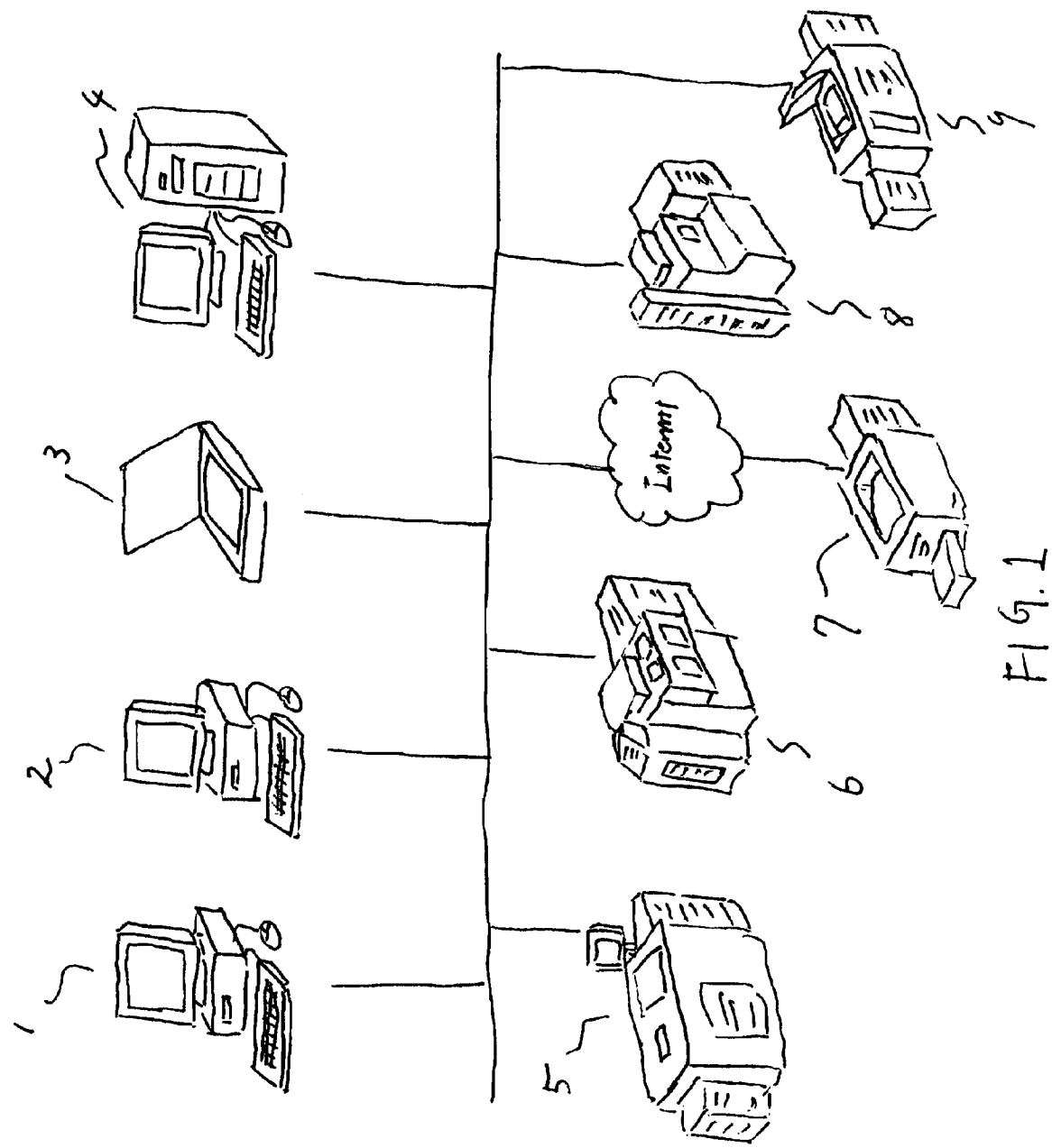
FIG. 1 schematically illustrates a print management system having multiple printers.

According to embodiments of the present invention, a large number of print jobs can be speedily and efficiently processed. FIG. 1 illustrates an example of a print management system in a print shop having multiple printers. Client computers 1 and 2 are connected to a server 4 via a local area network (LAN). Scanner 3 is also connected to server 4 via the LAN. In this example, B&W printers 5, 6, and 7 and color printers 8 and 9 are connected to the server through the LAN.

In this example, printers 5-9 are commercial standard high-end printers that can handle high speed, high quality printing. Each of the printers 5-9 has multiple paper trays to store paper of various sizes, color, and types. Further, some of the printers 5-9 are equipped with a sophisticated output sorting mechanism with multiple output trays to perform collate printing or other print finishing functions. Each printer has one or more display monitors to display the status of the printing and various warning and instruction messages to a user. Each printer is equipped with its own central processing unit (CPU) and appropriate hardware/software to control its own printing operations, and communicates with server 4 via a LAN. Some of these printers may also be multifunction printers that can perform copying and scanning of documents. Appropriate server software is installed in server 4 to perform various standard network administrative functions.

In this embodiment, in addition to the server administrative software, print job management software is installed on server 4 for managing a large number of print jobs that come into a print shop. Once a print shop operator calls the print job management software, server 4 reads out the print job management software to a random access memory (RAM) of the server to carry out various functions of the software, including management of print jobs.

A print job is a print request specifying various desired options together with a document to be printed. For example, a customer may bring a floppy diskette containing a file in the PDF format for printing with a particular finishing option. The print shop operator asks the customer what kind of print jobs is desired to figure out print job parameters. Alternatively, the customer may be asked to fill out a questionnaire sheet to describe what print options he/she desires. For example, the customer may desire that the document be printed on 24 lb 25% cotton letter size paper in full color in the double-sided printing mode in the amount of 100 copies. The print shop operator then records these job parameter values along with customer information as a file and store the file and the source PDF file onto the hard disk drive or other secured storage device so that the print job parameters are associated with the file.

Print jobs also may be generated by a customer's requests to copy a document. When a customer brings a document for copying, the shop operator scans the document using scanner 3 (which may be a color and/or B&W scanner) and converts the document into a digital file and thereafter creates a data file associated with the scanned source document in a manner similar to above.

Theses data files representing print jobs and associated files are forwarded to server 4. This way, numerous print jobs are generated and collected by server 4 on which print job management software is running.

The print job management server 4 running print job management software receives the print job files and analyzes and processes the print jobs. The print job management software preferably is designed to run on Windows OS, Macintosh OS, or Unix X Windows or other popular computer operating systems implementing a GUI (graphic user interface), such as a touchscreen and/or a mouse and a keyboard, coupled with a display monitor. Server 4 (or any suitable data processing apparatus) running print job management software of embodiments of the present invention is hereinafter referred to as "print job management server." In this application, the terms "print job management server" and "print job management apparatus" broadly refer to any data processing apparatus that can implement various features of embodiments of the present invention described below with appropriate hardware/software.

Main Screen

Figure 2:
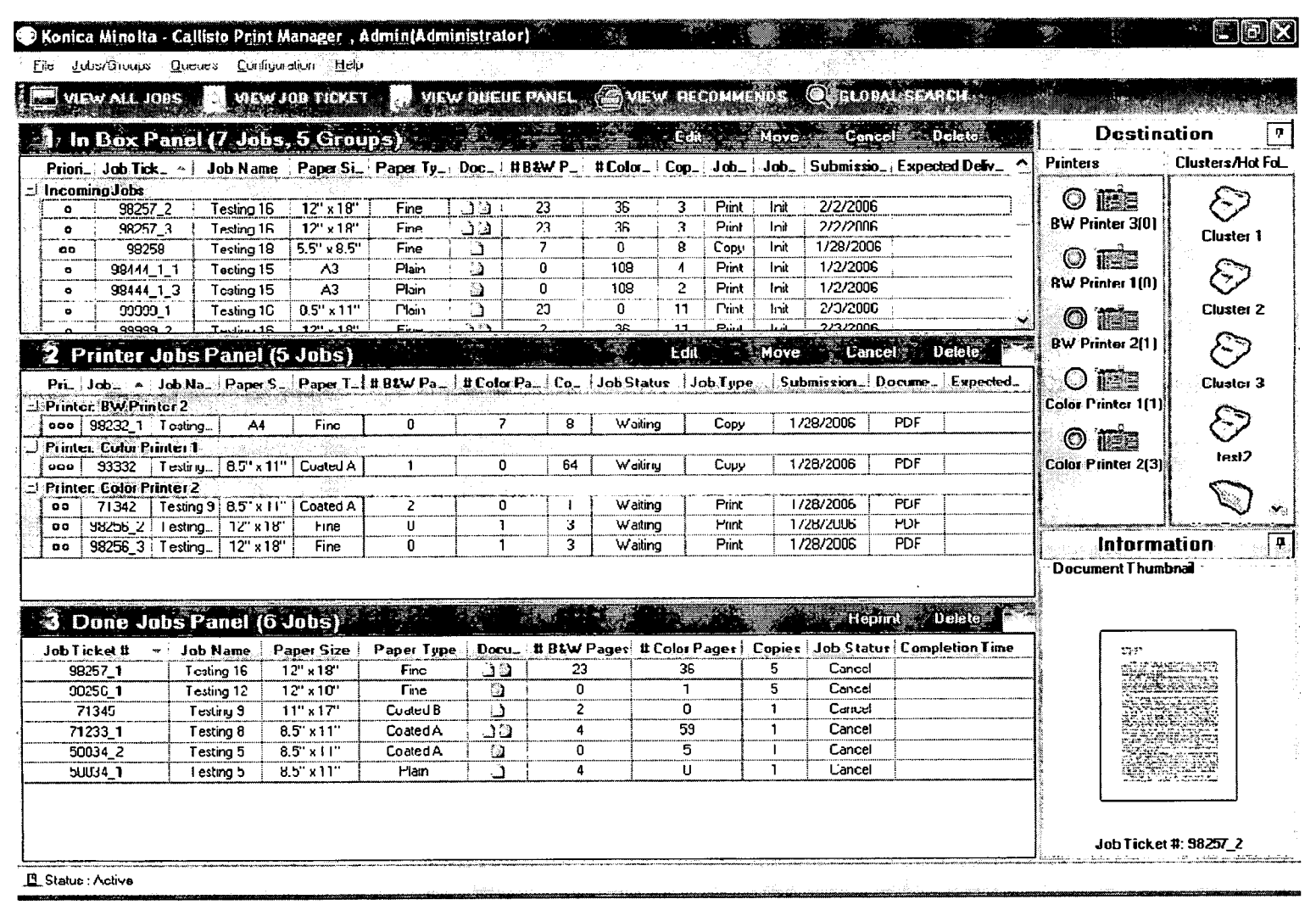

In operation, the print job management server 4 presents a Main Screen shown in FIG. 2 on a monitor of the server 4 (or on a monitor of client computer 1 or 2 or on a monitor of any one of the printers 5-9 when remote access to the print job management software is possible at the client computer or the printer). Referring to FIG. 2, the In Box Panel contains all new incoming print jobs sent to the print job management server 4 under the header of "Incoming Jobs." One row in the In Box Panel contains one print job. Print jobs listed in the "Incoming Jobs" in the In Box Panel have not yet been assigned to a printer(s). The Job Ticket Number column lists job numbers assigned to respective print jobs. Values of select job parameters, such as Paper Size, Paper Type, Document Color, Job Types, the number of copies/prints, etc. are also indicated in the In Box Panel.

The Printer Jobs Panel displays active jobs in all the printers monitored by the print job management server 4. The Completed Jobs Panel displays completed or cancelled print jobs. At the right-hand side of the Main Screen of FIG. 2 is the Destination Panel indicating all the connected printing devices for processing print jobs.

The Destination Panel displays icons of printing devices for printing and is divided into two sections: Printers and Clusters/Virtual Queues. The Printers pane shows icons of actual physical printers that are connected to the server. The Clusters/Virtual Queues pane shows Clusters and Virtual Queues. Clusters and Virtual Queues are software-defined virtual printing devices to which print jobs can be submitted for performing designated printing operations, and will be described in more detail below.

The operator can drag and drop a print job from any of the Inbox, Printer Jobs Panel and Completed Jobs Panel to one of the icons displayed in the Destination panel. The result is that the print job management server forwards the print job to the selected printing device so that the designated Printer (or Cluster or Virtual Queue) starts processing the corresponding printing operation. As a result, the print job entry in the In Box Panel moves to the Printer Jobs Panel. Once the print job is completed, the job entry moves from the Printer Jobs Panel to the Completed Jobs Panel.

A Cluster is a software-defined virtual printing device designed to perform a certain class of print jobs more efficiently and accurately. It is a combination of two or more of printers with a specified rules/algorithm. When a print job is assigned to a Cluster, the print job is split into two or more jobs by a preset or user-defined rules/algorithm, and the divided jobs are processed by the respective printers designated by the Cluster. For example, suppose that a print job (Job No. 12345) containing 10 color pages and 20 B&W pages is submitted to a Cluster that combines Color Printer 1 and BW Printer 1 with a rule requiring all color pages to be printed by Color Printer 1 and all B&W pages to be printed by B&W Printer 1. Then, the print job is divided into job 1 containing all color pages and job 2 containing the remaining B&W pages. Thereafter, job 1 is sent to the Color Printer 1 and job 2 is sent to B&W Printer 2 for respective printing operations.

In this particular embodiment, a five (5)-digit job number is assigned to a new print job, and if the job is split into two or more jobs (as a result of being assigned to a Cluster, for example), these split jobs bear a supplemental number separated by an underbar to indicate their association. In the above example, when the Job No. 12345 is sent to the Cluster, the print job is split into Job No. 12345_1 for color pages and Job No. 12345_2 for B&W pages. Upon this split, Job No. 12345 disappears from the In Box Panel, and Job No. 12345_1 appears under "Color Printer 1" and Job No. 12345_2 appears under "BW Printer 1" in the Printer Jobs Panel of the Main Screen.

A Virtual Queue overrides any job parameter values of a print job that do not match the values of corresponding job parameters specified by the Virtual Queue. For example, a Virtual Queue may specify a particular B&W printer, tray, paper size, and a particular paper type (such as plain paper). In this case, a print job designating color printing on A4-size 24 lb paper is sent to a Virtual Queue that specifies a particular B&W Printer and letter-size 18 lb paper, for example, the print job management server ignores these original job parameter values of the print job and replaces them with the job parameter values specified by the Virtual Queue. As a result, the B&W printer prints out grey-scale images on letter-size 18 lb paper. This feature is useful when the existing printer settings do not match the requirements of a print job, but the customer requests a quick review of the document first, for example.

The server 4 may also be configured such that when all the printings regarding the split print jobs are completed, the server 4 moves these jobs to Completed Jobs Panel in the Main Screen. That is to say, according to the specific example presented above, when both printings regarding Job Nos. 12345_1 and 12345_2 are completed, these Jobs move to Completed Jobs Panel in the Main Screen. In a preferred embodiment, the split jobs are combined when their printings are completed, and the original Job Number of the print job appears in Completed Jobs Panel. Virtual Queues and Clusters described above may be created and specified by users or the print shop operators, depending on their needs. Default or sample Clusters and Virtual Queues may also be provided as part of the print job management software for convenience to users.

Double clicking the icon in the Destination Panel provides the user with an access to the properties of the Printers, Clusters, and Virtual Queues. The parenthesized number at the Printer, Cluster and Virtual Queue icons visually indicates the number of jobs in the respective print queue (i.e., in the waiting list (print spooler) of the particular printer). Other status of the printers (and Cluster and Virtual Queue), such as "disconnected," "unavailable," etc., may also be visually or pictorially indicated at each icon or in a separate pane.

Job Ticket

In embodiments of the present invention, print jobs are organized by using database entries, named "Job Tickets." A Job Ticket specifies values of various print job parameters, such as paper size, paper type, user identification information and other related information, and associates itself to the source file(s). To view the content of the Job Ticket, a user can right click on a print job entry in any of the In Box Panel, the Printer Jobs Panel, and the Completed Jobs Panel, and selects "View Job Ticket" from a pup-down menu, for example.

Figure 3:
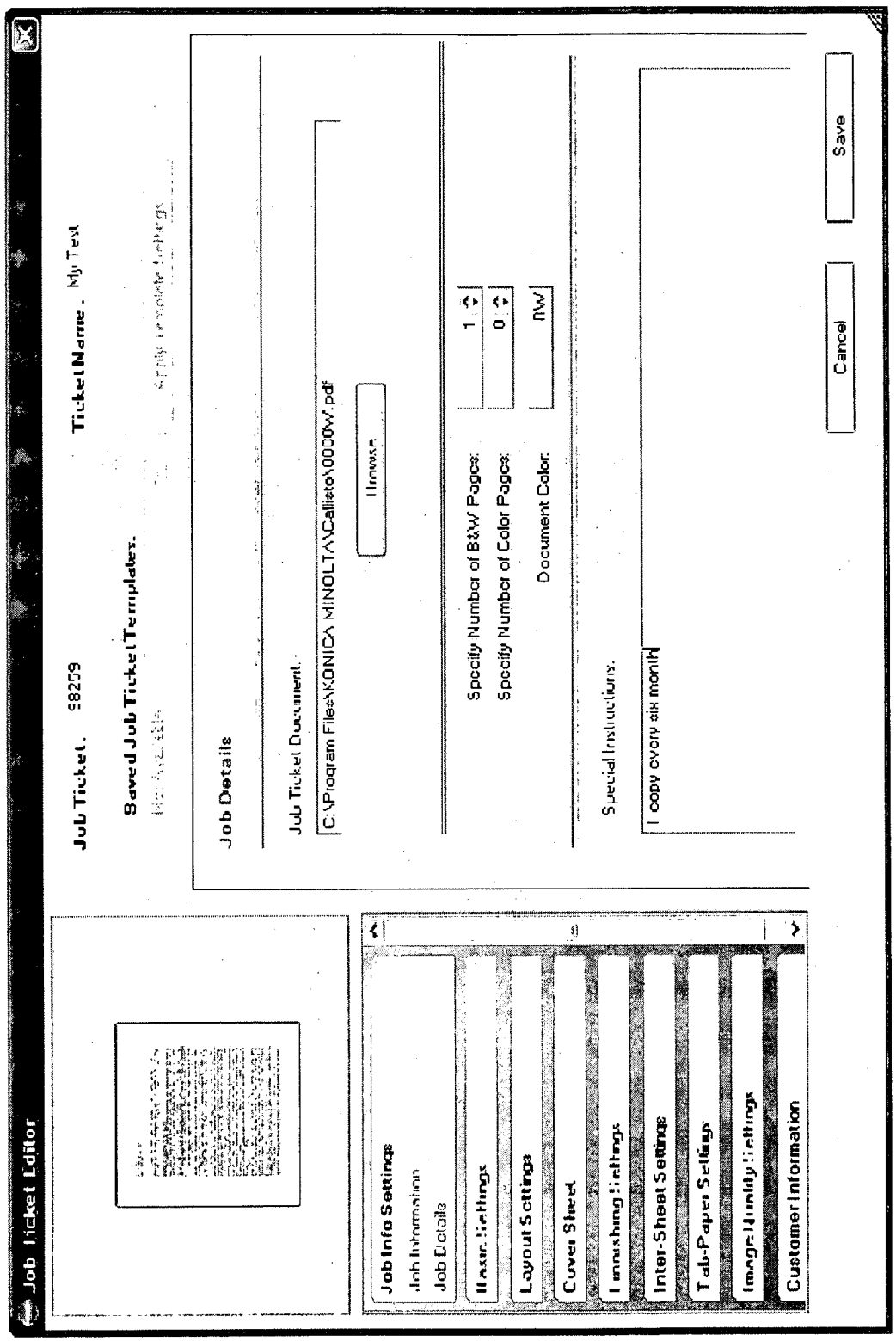
FIG. 3 schematically illustrates a Job Ticket Editor according to an embodiment of then present invention.

Based on instructions and information received from a customer, a print shop operator may manually enter the values of these job parameters using a Job Ticket Editor screen, which is a graphic user interface (GUI) accessible from the Main Screen by an operator through a Windows pup-down menu or other means. FIG. 3 shows an example of the Job Ticket Editor. As shown in FIG. 3, an operator can type in or choose from the pup-down menu values of these job parameters.

Figure 4:
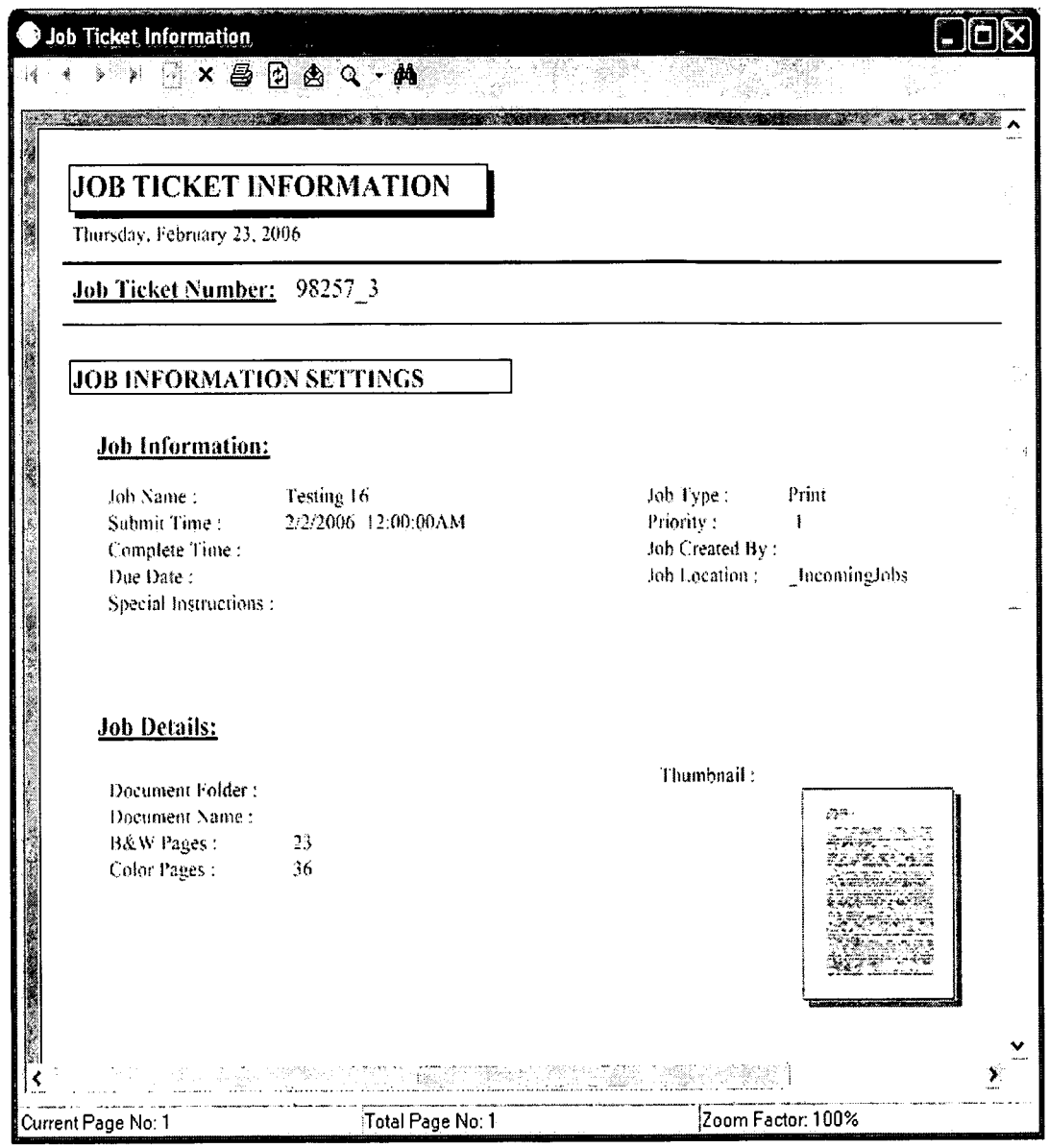
FIG. 4 schematically illustrates a data content of a Job Ticket according to an embodiment of the present invention.

FIG. 4 shows an example of the data content of a Job Ticket. Referring to FIG. 4, in this particular example, a Job Ticket includes a Job Ticket number, Ticket Name as well as the values of the following groups of various other job parameters: Job Info Settings, Basic Settings, Layout Settings, Cover Sheet, Finishing Settings, Inter-Sheet Settings, Tab-Paper Settings, Image Quality Settings, and Customer Information.

Job Info Settings include Job Name, Submit Time, Completed Time, Due Date, Type (print or copy), Priority, the identity of the person who created the Job Ticket, Job Location, and Queue Recommendation (i.e., a recommendation on a particular printer or other destination). Job Info Settings further include the directory pass at which the file containing the document to be printed is located in a local or networked hard drive, the number of B&W pages, the number of color pages, and Special Instructions.

Basic Settings include the number of copies to be made, the orientation of paper (portrait or landscape), information on collate printing, information on offset printing, the original paper size, the output paper size, the paper type, and paper source information, such as tray numbers. Layout Settings include settings concerning print layout. Cover Sheet includes settings on cover sheets to be produced or prepared. Finishing Settings specify paper finishing settings, including the paper binding options, such as stitch, staple, and punch.

In addition, the server may be configured to access and analyze the source file to determine the values of some of the job parameter directly from the source file. Then the server enters these values in the corresponding job parameter entries in the corresponding Job Ticket without requiring a user to manually enter them. This will help eliminate clerical errors and further facilitate the operation of the print shop.

In this application, the term "value" means, when referred to with respect to variables or parameters, any numerical quantity, characters, and other types of entries that can specify variables or parameters, and including, but not limited to, a specific setting of any of the job parameters appeared herein.

Job Grouping

Each day, a print shop receives a large number of new print jobs specifying a variety of printing requirements. As arrived, these print jobs are not organized, yet they must be processed promptly and accurately. Embodiments of the present invention offer an efficient and highly transparent organization of incoming print jobs to facilitate the operation of a print shop. To this end, a print job management server of embodiments of the present invention analyzes incoming print jobs and classifies the incoming jobs into several or more groups based on prescribed criteria so that the incoming print jobs are purposefully organized and arranged for use in subsequent processes by the server and the operator.

Figure 5:
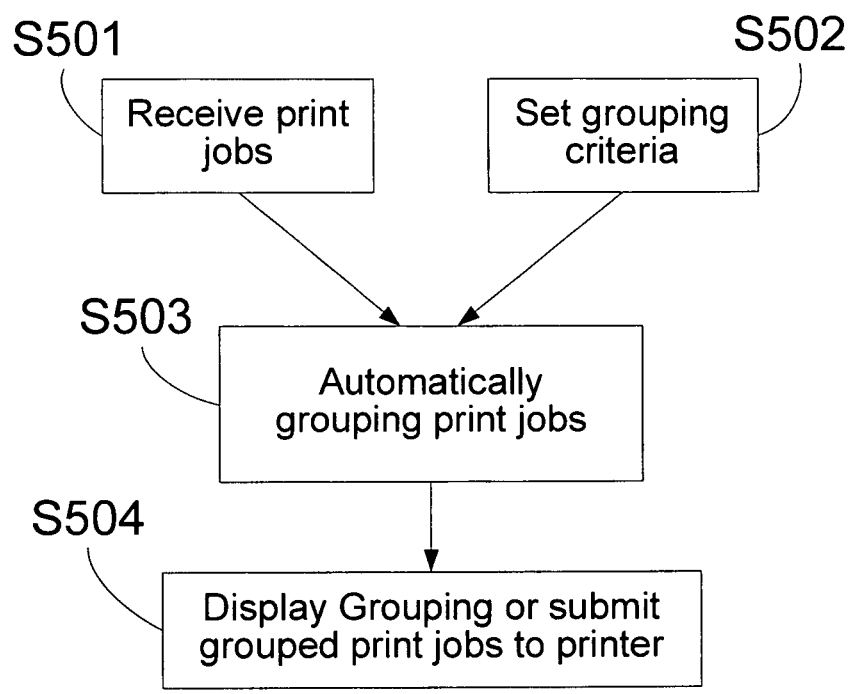
FIG. 5 is a flow chart illustrating a method for managing a plurality of print jobs according to an embodiment of the present invention.

FIG. 5 is a flow chart illustrating a method for managing a plurality of print jobs, which is implemented in a print job management server, according to an embodiment of the present invention. In step S501 the print job management server receives a plurality of print jobs. In Step S502, the server prescribes grouping criteria for classifying incoming print jobs. Step S501 can be performed before or after Step S502, or at the same time. With the grouping criteria set in step S502, the print job management server automatically classifies all incoming print jobs into groups without requiring any user intervention (S503). In step S504, the print job management server transmits a result of the grouping for use by the user or the print management system. For example, in step S504, the server may cause an attached display monitor to display the result of the grouping to a user so that the user can utilize the grouping information in subsequent operations. Also, print jobs that have been assigned to a particular group may manually or automatically be submitted to a particular printer for printing.

Once the grouping criteria is given, the print job management server of embodiments of the present invention can be set up so as to analyze all incoming new print jobs automatically to start the grouping operation on the incoming print jobs (referred to as "Auto Grouping Mode" hereinafter). Alternatively, the print job management server can be set up such that all incoming print jobs are first placed under the Incoming Jobs header in the In Box panel and the grouping operation is commenced upon a request form a user (referred to as "On-Demand Grouping Mode" hereinafter). At any rate, in both Modes, once grouping is initiated, there is no need for the user to intervene the operation—the grouping of the print jobs continues until the user 14 interrupts, or until the grouping is completed. If a print job is determined not to belong to any of the existing Groups, such a job is left under the Incoming Jobs header in the In Box panel as unassigned.

Figure 6:
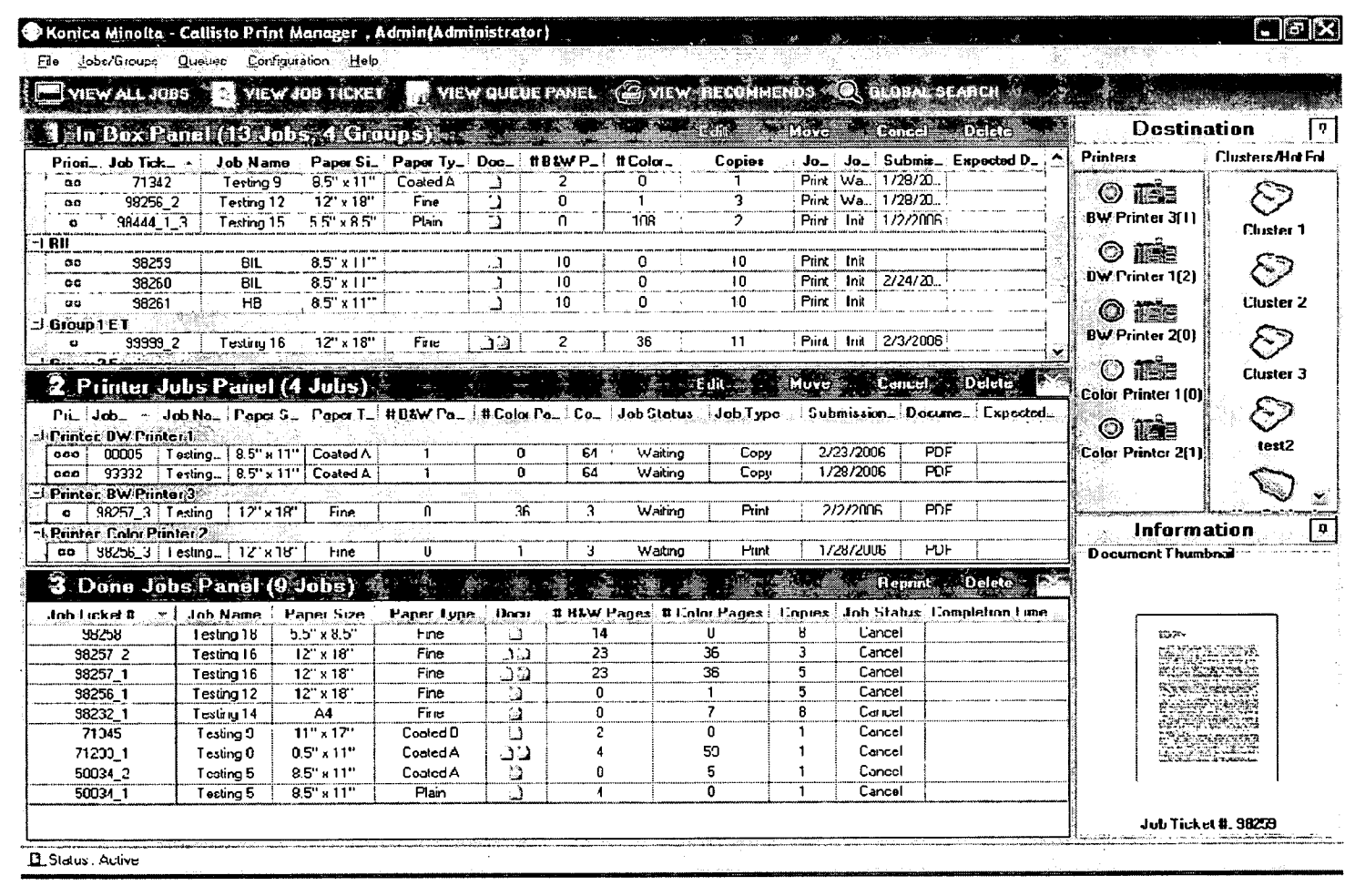

FIG. 6 shows In Box Panel displaying a result of a grouping operation. As shown in FIG. 6, grouped print jobs are placed under respective group headers in the In Box Panel. Basic job parameter values of each print job are also conveniently displayed on the screen. This particular In Box Panel shows that there are at least two Groups currently: Group BIL and Group 1 ET. Group BIL contains 3 print job entries. The print jobs listed under Group BIL all have the same priority setting, the same paper size and the same color setting (B&W). However, a print job entry under Group 1 ET (Job No. 99999_2) differs from the entries under Group BIL in at least paper size and color settings. This visual presentation provides a user with convenient and reliable access to the status of print job grouping. For example, it reduces the amount of time operators have to spend in matching print jobs to printers (or virtual printing devices, such as Clusters and Virtual Queues), and also allows more efficient use of printers. With appropriately designed grouping criteria, all print jobs categorized in a particular group may be sent to a single destination device, such as a particular printer, Cluster, or Virtual Queue, at once. For example, the three entries under Group BIL in FIG. 6 may be submitted to an appropriate B&W printer at once.

Manual Creation of Target Groups

Figure 7:
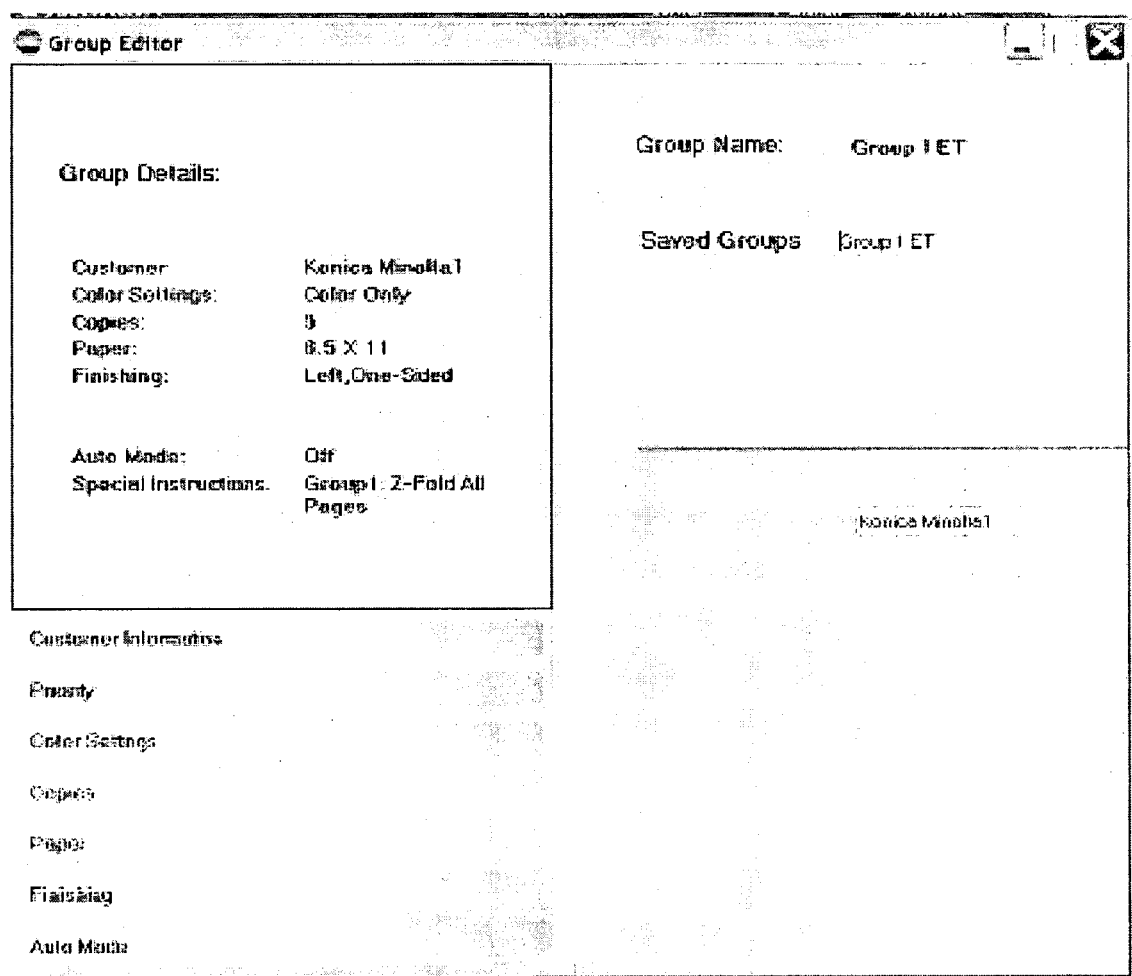
FIG. 7 schematically illustrates a Group Editor screen according to an embodiment of the present invention.

As the grouping criteria for grouping print jobs, fixed target Groups to which incoming print jobs are being assigned can be specified in advance. For example, a print shop operator can manually create each target Group by specifying values of certain job parameters using a Group Editor screen, which is accessible from the Main Screen by the operator. FIG. 7 schematically illustrates an example of the Group Editor Screen. As shown in FIG. 7 an operator can type in, or choose from the drop-down menu, values of these job parameters. In this particular example, the job parameters that can be specified by the user to define a Group include Customer Information (e.g., the customer name), Priority (high, medium, or low), Color Settings (Color Only, Black & White only, Mixed), Copies (the number of copies), Paper (size, type, weight color, input tray number), Finishing, and Specific Instructions. In a preferred mode, a set of the job parameters that can be set to define a Group is a subset of the job parameters that can be set to define a Job Ticket (thereby a print job) described above.

Alternatively, a Group can be created by referencing to a particular print job. The operator may select a single print job and use the Group Editor to create a new Group by imposing all or part of the job parameter values of the selected job onto the new Group. For example, the print job management server can be set such that by right-clicking on a print job entry in the In Box Panel on the screen, the operator can choose the "Create Group" option to open the Group Editor screen that already contains all job parameter values transferred from the Job Ticket of the print job. The operator can then accept all the values, as it is, or if desired, delete or modify some of the job parameter values to create a Group. This way, the operator can easily create desired Groups.

While the above example of the Group Editor allows the operator to set the values of numerous job parameters, the operator does not have to specify the values of all of the job parameters that appear in the Group Editor to define a Group. By setting only some of the job parameters, a Group defined by only those job parameter values (high-level group) can be created. For example, if a Group is created by setting the job parameter "Color" to "Black and White" and the job parameter "Paper Size" to "8.5×11," all incoming jobs that have the same values in Color and Paper Size job parameters (i.e., B&W and 8.5×11) will be placed in that Group regardless of the values of other job parameters. Thus, depending on the user needs and design of the system, mutually exclusive Groups, overlapping Groups, and hierarchically structured Groups can be created. However, if desired, the server can permit only certain types of group creations. For example, it can be configured so that only mutually exclusive Groups can be created by a user. Furthermore, instead of specifying particular values of job parameters, a range of job parameters can be specified to define Groups.

Further, default Groups can be provided so that often-used Groups are pre-installed in the print job management server. The data that defines default Groups can be stored in a storage device that is accessible from the print job management server.

Figure 8:
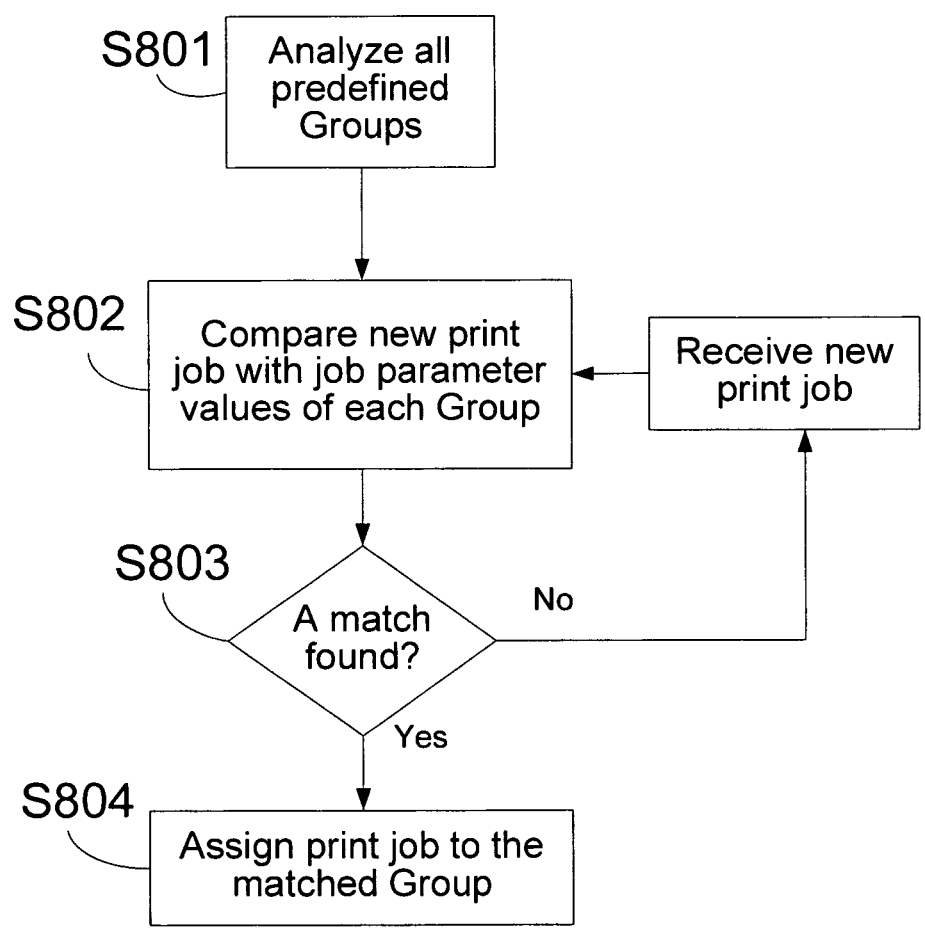
FIG. 8 is a flow chart illustrating a grouping method according to an embodiment of the present invention.

FIG. 8 illustrates a grouping method using predefined Groups according to an embodiment of the present invention. Thus, this example assumes that the server already defined Groups into which incoming print jobs will be placed, as the grouping criteria. The print job management server first analyzes all the predefined Groups created by a user (S801) to determine the properties of the predefined Groups, and compares the job parameter values of the Groups with the values of the corresponding job parameters of the incoming print job (S802). If an incoming job defined by a Job Ticket matches the job parameter values of a Group (S803), the job is placed in that Group (S804) and listed under the header of that matching Group in the In Box Panel on the screen. For example, suppose that Group 1 ET is defined by specifying values of the job parameters of Customer, Color Settings, Copies, Paper, Finishing, and Special Instructions. If the print job management server finds a print job that has exactly the same respective values in these job parameters, such a print job will be placed under the Group 1 ET header in the In Box Panel. Other appropriately designed comparison/grouping algorithms may also be used.

Automatic Creation of Target Groups

Rather than using predefined or user-specified static Groups, the print job management server can be configured such that target Groups are created dynamically based on the job parameter values of incoming print jobs. In this mode, the server first determines one or more of the job parameters to look for, and analyzes the values of these job parameters in incoming print jobs. According to the values of the job parameters, the server groups the incoming print jobs into separate groups. Thus, groups are created based on values of these particular parameters in the incoming print jobs, thereby eliminating the user's need to create Groups. The print job management server can use this scheme as the grouping criteria for conducting the automatic grouping operation.

Figure 9:
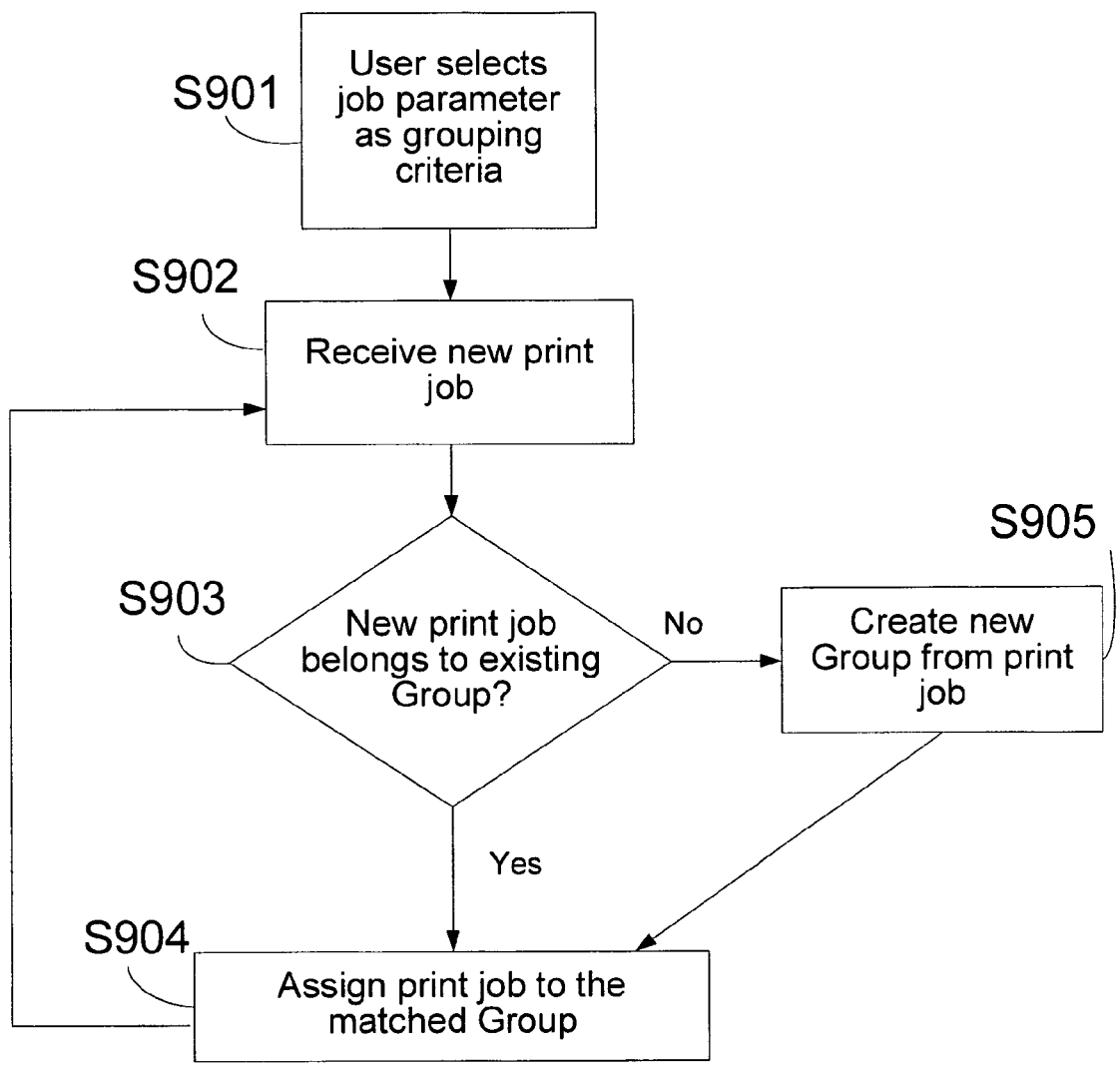
FIG. 9 is a flow chart illustrating a grouping method according to an embodiment of the present invention.

FIG. 9 illustrates an example of an algorithm that can be implemented on the server to perform this operation, according to an embodiment of the present invention. As shown in FIG. 9, a user first selects a particular job parameter (or job parameters) to define grouping criteria (S901). When a first print job arrives, the value of the selected job parameter is read out from the print job (Job Ticket) to define a first Group (S905) (assuming that there is no previously defined Group to put the first print job into) so that the first Group will receive all print jobs that have the same value as the first print job in the selected job parameter. The first print job is categorized into the first Group just created (S904). Thereafter, subsequent print jobs are analyzed to determine whether the print jobs belong to the first Group (S902, S903). All subsequent print jobs that have the same job parameter value as the first Group are placed in the first Group (S904). When a print job having a different value in the selected job parameter arrives, a new Group (second Group) is created based on the new value of the job parameter found in such a new print job (S905). Like operations continue to create the third, fourth, Groups. Thus, once a job parameter (or job parameters) according to which the grouping operation is performed (S901) is selected, the grouping operation (steps S902-S905) can be performed without user intervention. Other appropriately designed comparison/grouping algorithms may also be used.

For example, the operator can choose the "Finishing" job parameter to define criteria for grouping print jobs. Suppose that first 10 incoming print jobs have only two differing values in Finishing: "left-side staple" (4 jobs) and "bare printing" (6 jobs). Then, when analysis of these first 10 print jobs is completed, two Groups corresponding to these two job finishing values are automatically created and these 10 print jobs are placed in the respective groups. If the 11th incoming job has a "right-side staple" value in the Finishing job parameter, then a new Group is created and the 11th job is placed in that Group. The similar operations continue until the operator interrupts it, or after a certain user-specified number of incoming jobs are processed, for example.

The name of the Groups that are created in this way can be set by using a certain predetermined rule, such as using the first three letters of the job parameter that defines the groups, followed by a numerical number, for example. In the above example, the names of the first and second Groups would be FIN1 and FIN2, and the name of the third Group would be FIN3. This way, the grouped print jobs are listed under the appropriately named group header in the In Box Panel on the screen.

In another embodiment, rather than serially processing the above grouping operation, a plurality of print jobs can be grouped at once in a similar manner. For example, after a certain number of print jobs comes in under the Incoming Jobs header in the In Box Panel and is piled up there, the operator may enter an automatic grouping command by selecting one or more of job parameters to prescribe the grouping criteria. In response, the server will process the print jobs from the top of the print jobs listing under the Incoming Jobs header using the process described above, so that all print jobs that are then listed under the Incoming Jobs header will be grouped in accordance with the selected job parameter (s).

The grouping operation can also be applied to a set of print jobs that are selectively picked up by an operator. For example, a user may select a certain set of print jobs by selectively highlighting print job entries in the In Box Panel, and then instruct the server to perform the above-described grouping operations.

During or after the grouping operation, an operator can open and monitor the contents of groups by reviewing the In Box Panel. As noted above, the operator can assign the print jobs that belong to a particular Group to a desired destination device, such as a Group, a Cluster or a Virtual Queue, for printing.

The server can be also configured so that once grouping is completed (or during the grouping process), all print jobs grouped into a particular Group are immediately submitted to a particular printer, a particular Cluster, or a particular Virtual Queue for printing without a delay (referred to as "Auto Printing Mode"). If coupled with the automatic grouping operations described above, grouping of print jobs and printer assignment and execution of printing can all be performed without user intervention. This mode is referred to as "Full Auto Mode." In the Full Auto Mode, the groups dynamically created as described above may only be transitory, and may be configured to disappear once print jobs in the respective group are submitted to printing devices for printing, for example.

Queues Panel

As described above, print jobs specify a variety of job parameters, such as color, paper type, paper size and finishing options. There is virtually an unlimited number of possibilities in job parameter settings of print jobs. However, due to limited functionalities of each printer, once set up in a certain way, even a very large print shop cannot handle every conceivable print job without altering the initial settings of some of the installed printers. The print jobs that cannot be handled without altering the existing printer settings are referred to as "non-standard print jobs" hereinafter. To name a few examples, even commercial grade high-end printers have a finite number of input paper trays, each containing paper of a particular size, such as letter size or legal size, and may not be equipped with sophisticated finishing functions that are required by certain jobs. Such printers cannot be used when a particular finishing option is specified. Thus, in order to meet today's customer needs, print shop operators must often change the settings of the existing printer(s), the paper size in a paper tray, etc., in order to process non-standard print jobs.

However, it is not always easy to find a printer whose settings are relatively easily changed. The operator can review the values of the job parameters set in the requested print job by selecting the job entry in the In Box Panel and by opening the Job Ticket screen. The operator can also review the printer settings of each of the printers (or virtual printing devices) by, for example, clicking on printer icons displayed in the Destination Panel. Then, theoretically, the operator can manually compare the values of job parameter set in the print job with the printer settings to find out a printer having the initial printer settings that are closest to the corresponding parameter values of the print job. However, when numerous printers (and virtual printing devices) are available for printing, this search is cumbersome and time-consuming.

Auto-printing operations discussed above will often leave print jobs that do not meet any of grouping criteria in the Incoming Jobs pane. In order to print these jobs, they must be manually assigned to a printer(s). Also, a user may elect to manually select a printer device even though automated grouping and printing options are possible. When numerous printers are available, manually locating the best or exact matching destination device (Printer, Cluster or Virtual Queue) is a difficult and time consuming task.

A print job management server according to embodiments of the present invention provides convenient features to assist users to find a printing device (a Printer, a Cluster or a Virtual Queue) that exactly or closely conforms to the job parameter values of a print job. In one embodiment, a print job management server compares the printer settings of each of the printers with the values of relevant job parameters of a print job, and if any of the printer settings in one printer matches the corresponding parameter value in the print job, that match is communicated to the user.

In a particular embodiment, the print job management server can launch a Queue Panel at request of a user. For example, when an operator selects a particular print job by clicking one of the print job entries in the In Box Panel, a Queue Panel window appears. The Queue Panel displays all Printers, Clusters and Virtual Queues that are connected or defined by the print job management server as available printing devices for printing jobs, and highlights the printer settings that match the corresponding job parameter values of the print job in question.

Figure 10:
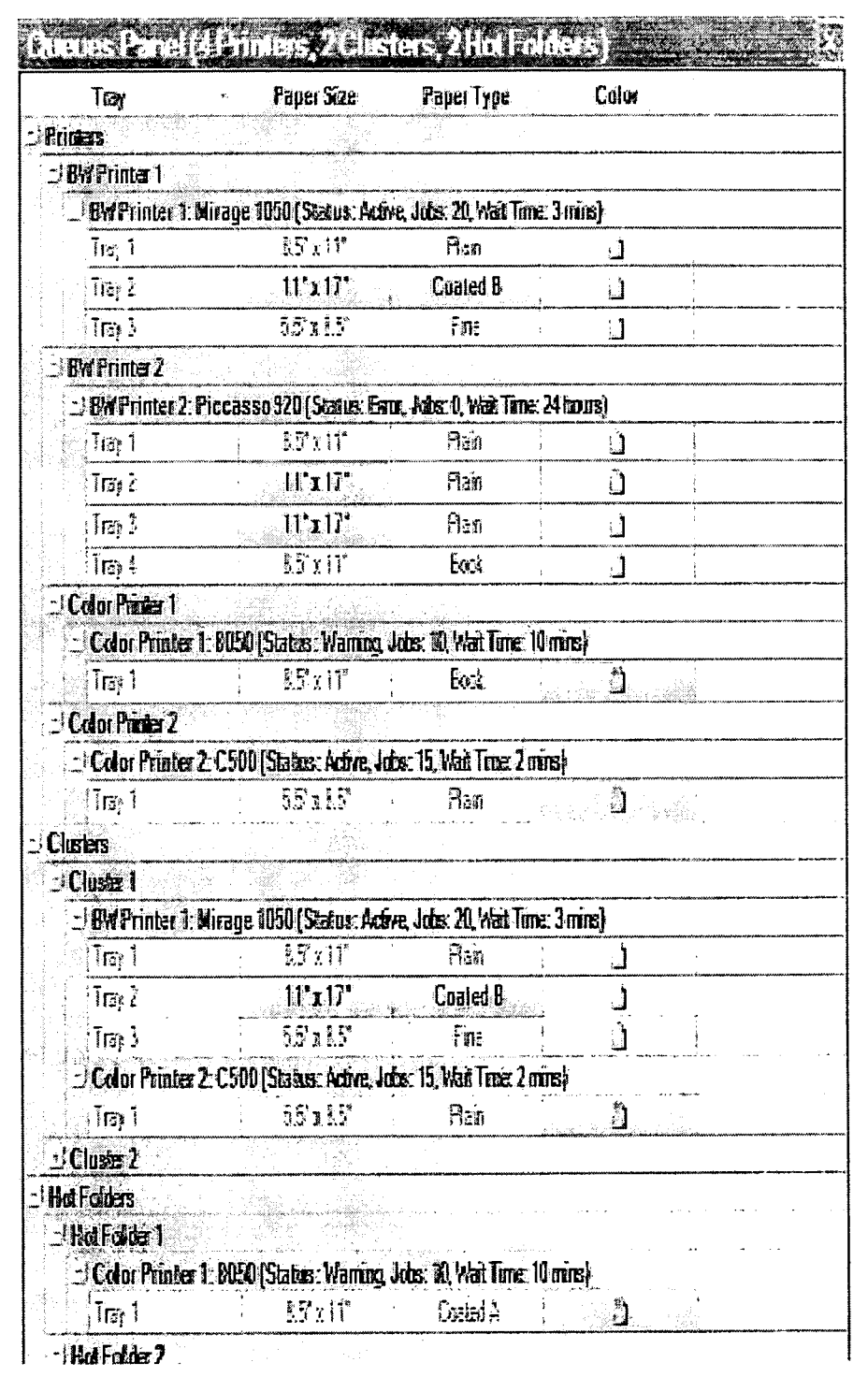

FIG. 10 illustrates an example of the Queue Panel for a specified print job. Referring to FIG. 10, the Queue Panel lists all available printers and software-defined virtual printing devices: Printers, Clusters, and Virtual Queues, together with the printer settings of Color, Paper Size, and Paper Type of each printer. If any of the printer settings of these parameters match a value(s) of the corresponding job parameter(s) specified in the print job, such a printer setting is highlighted in yellow. With this information, the user can narrow the search for the best printing device to process the print job. In the example of FIG. 10, the Queues Panel indicates that BW Printer 1 1050 has paper trays 1-3, respectively containing various sized paper of different types. As indicated in yellow, the Queues Panel shows that the Paper Size and Paper Type settings in Tray 2 of the printer match the Paper Size and Paper Type values of this particular print job. Similarly, other highlighted portions indicate that the printer settings match some of the job parameter values of this print job. The status of each printer, such as operating status, the number of spooled print jobs, and approximate waiting time, is also displayed in the corresponding header row to assist the operator, which is also convenient to a user. For example, if two Printers are found to have an exact match with respect to these three printer settings, the operator can select one of the Printers that has a less waiting time for printing.

Thus, the Queue Panel displays how each printing device conforms to the job parameter values required by a print job. Therefore, a user can easily and quickly locate a printing device to perform the requested print job or to find out which printer settings should be modified to perform the requested print job. In essence, the data in the Queue Panel provides the key data the operator needs to complete this otherwise time-consuming and difficult task.

When a printer that does not have a perfect match (meaning, say, there is no match in Paper Size) receives the print job, the print job management system can be configured such that the monitor at the selected printer will display a warning message indicating that the operator has to perform a certain manual task to complete the submitted print job. For example, when the operator at the server selects a printer that has a match only for the Color and Paper Type settings, an operator at the printer will be notified that the paper size of a certain input tray needs to be changed to a particular paper size to process the print job. Alternatively, before selecting such a non-matching printer as the job destination, the operator can change the paper size in advance so that the Queue Panel now displays a perfect match to that printer.

The Queue Panel of the above example also has the following advantage. As described above, a Cluster is a combination of two or more of the printers together with specified rules/algorithm to perform a print job. The Queue Panel visually provides a point-of-reference for the operator to see these linked printers to determine which features of these printers mach the requirements of the selected print job. This visual reference makes the Cluster feature easier to locate, identify and use. Moreover, even when a perfect match is not found with respect to a Cluster, the operator can easily identify what particular printer setting needs to be changed (or to be ignored) in order to cause a perfect match (or a quasi-perfect match) of the selected print job to the Cluster.

The printer settings that can be displayed in the Print Queues Panel are not limited to Color, Paper Size, and Paper Type. Depending on needs and the design of the print management system, other parameters, such as Finishing options, Layout Settings (e.g., double-sided or single-sided) may be listed in addition or in lieu of these parameters.

Thus, in order to help the operator determine a virtual or actual printing device for a print job, the Queue Panel lists destination devices (Printers, Clusters, and Virtual Queues) together with information on the printer status and information regarding matching of each printer setting with the specified printer job. This is useful and convenient especially where a large number of printers with various printer settings need to be managed by the print job management server.

In a preferred mode, as described above, the Queue Panel lists all connected printers and other virtual printing devices (Clusters and Virtual Queues). However, depending on the user preference, it may list only printers that have at least one setting that is found to match the job parameter value of the print job in question. This feature may be advantageous where the number of connected printers controlled by the server is very large and the Queues List would otherwise contain a long list of the printers and other virtual printing devices.

Printing Device (Printer/Cluster/Virtual Queue) Recommendation

As described above, the Queue Panel lists all the connected actual and virtual printing devices (Printers, Clusters, and Virtual Queues) together with information on the printer status and information regarding matching of each printer setting with the specified printer job. Based on the information displayed on the Queue Panel, the operator manually determines the best-matched and/or the second-best destination device(s). In another embodiment of the present invention, the print job management server can perform this determination in accordance with a user defined or preset criteria. This will further improve the ease and efficiency of print managing operations.

In one embodiment, given a print job, the print job management server of the present invention can recommend one or more printing devices (Printer, Cluster, or Virtual Queue) for that particular print job. By using an algorithm implemented by software, for example, the print job management server determines the suitableness of the printing devices for the print job. For example, the print job management server will first look for a printing device that supports the color of the document to be printed (i.e., the Color job parameter in the print job). Then, the print job management server will look for finishing option matches, and then will look for paper-related options, such as paper size and paper type, in order to progressively narrow the search for the best matching printing devices. The algorithm may be preset in the print job management software installed on the server, or it may be modified or altered by user inputs. For example, the server can be configured such that the operator can determine the priority in which the server considers these settings prior to making recommendations. Alternatively, or in addition, the operator can specify the algorithm itself to be used, such as which parameter should be used in what order in order to perform the recommendation operation.

In a particular embodiment, when the operator first selects a particular print job and selects the "View Recommends" option from the drop-down menu (or select View Recommends icon in the icon bar of the Main Screen), the server performs a searching operation in accordance with the above-described algorithm to determine a recommended printing device(s). Then, the server will launch a View Recommends Panel to visually indicate the recommended printing devices to the operator. In this example, although the arrangement of entries in the View Recommends Panel is similar to that of the Queues Panel, the View Recommends Panel lists only those printing devices (Printer, Cluster, or Virtual Queue) that are recommended by the print job management server.

As in the Queue Panel, a View Recommends Panel also lists the status of the printers listed therein. Based on the information displayed on the View Recommends Panel, the operator can readily decide what destination device to use for processing the print job. For example, if there are more than one exact matching printing devices, the operator may pick a device that has a shorter waiting time.

Figures 11, 12:
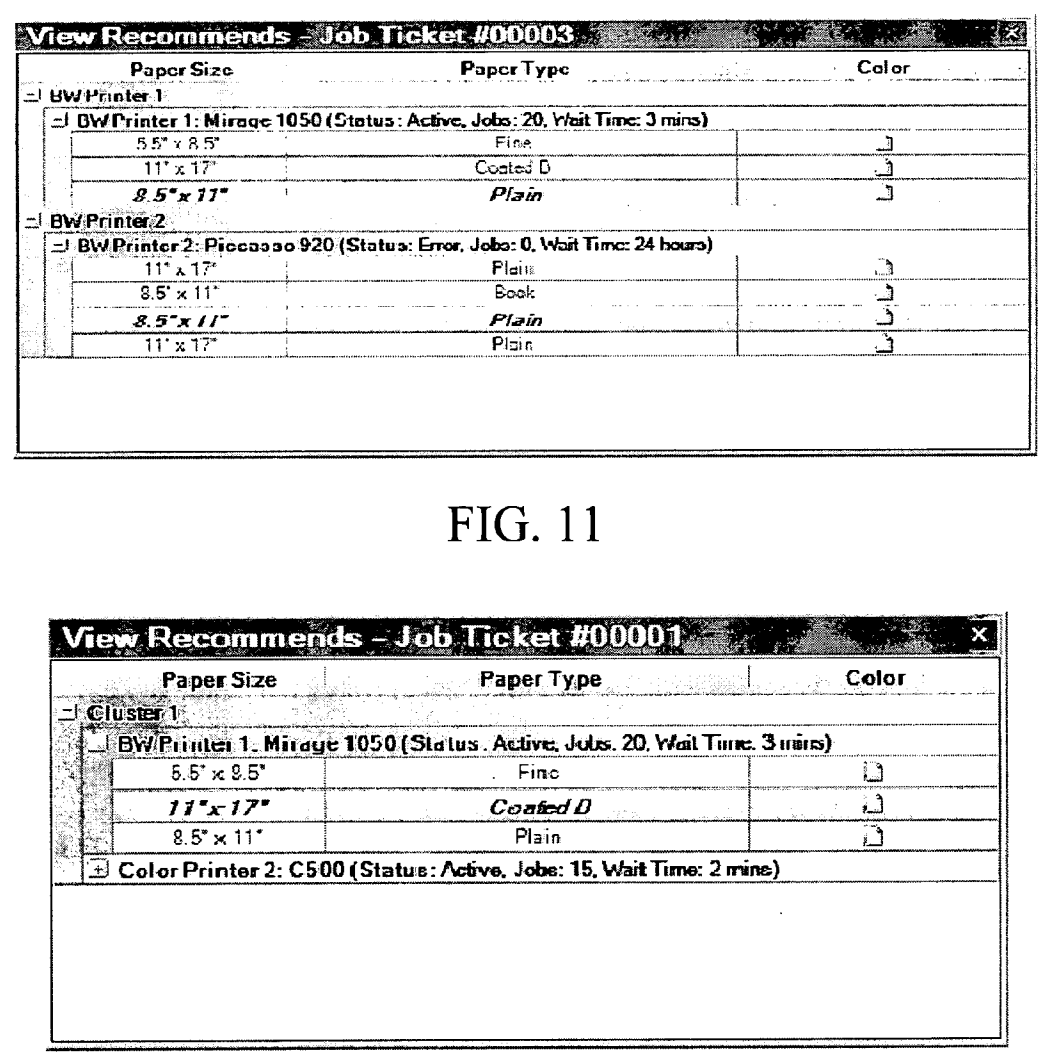

FIG. 11 illustrates an example of the View Recommends Panel. In FIG. 11, BW Printer 1 and BW Printer 2 appear in the View Recommends Panel, indicating that they are the recommended printing devices for Job Ticket #0003. As indicated by green-highlighted printer name and corresponding printer setting rows, these printers equally qualify, both having an exact match in the Paper Size, Paper Type and Color settings. However, the connection status of BW Printer 2 shows "Error," indicating that the printer needs to be serviced and is not available for immediate printing. Thus, the operator will likely choose BW Printer 1 for this print job.

FIG. 12 illustrates another example of the View Recommends Panel. Cluster 1 appears in the View Recommends Panel, indicating that Cluster 1 is the recommended printing device for Job Ticket #0001. As indicated in yellow highlighted printer name row, Color Printer 2 currently does not have printer settings that exactly match the corresponding job parameter values of the print job. In this example, the Paper Type job parameter mismatches. The operator needs to manually replace the paper content of Tray 2 of Color Printer 2, or if desired, can force the print job to be processed through Tray 2 to process this Job Ticket.

Because the server can determine printing devices that are suited to a given print job and the result is visually presented along with status information of each recommended printing device, an operator can easily identify the best printing device option for printing or for changing printer settings.

Selection Panel

In another embodiment, the above-described features of the Queue Panel and View Recommends Panel are combined so that all the information and functionalities discussed above with respect to these panels are accessible from a single, conveniently designed panel. In a particular embodiment, in place of the Queue Panel and View Recommends Panel, a View Selection panel is provided. When a user selects a print job in the In Box, and clicks on the "View Selection" button in the icon header row (or from the drop-down menu), a "Selection Panel" opens. A recommended printing device (or devices) appears in a manner similar to that discussed above. For example, a recommended printing device(s) is highlighted and expanded to show how printer settings match the job parameter values of the specified print job. A printing device(s) that has a perfect match with respect to all of the relevant printer settings may be highlighted in green and the corresponding tray may also be highlighted in green. The second best match that has a match in only some of the printer settings may be highlighted in yellow. Thus, as in the case above, the degree to which the printing devices match the print job can be indicated using different color.

All other non-recommended printing devices also appear in the Selection Panel. To save the space, printing devices that do not have a perfect match may be listed by presenting only their printing device names, for example. However, if desired, the operator can click on the printing device name to expand it, and review detailed printer settings of the selected printing device and how each of the printer settings matches the specified job parameter value. As in the case of Queue Panels discussed above, the individual printer settings that match the specified value of the print job parameter may be separately highlighted in yellow.

Figure 13:
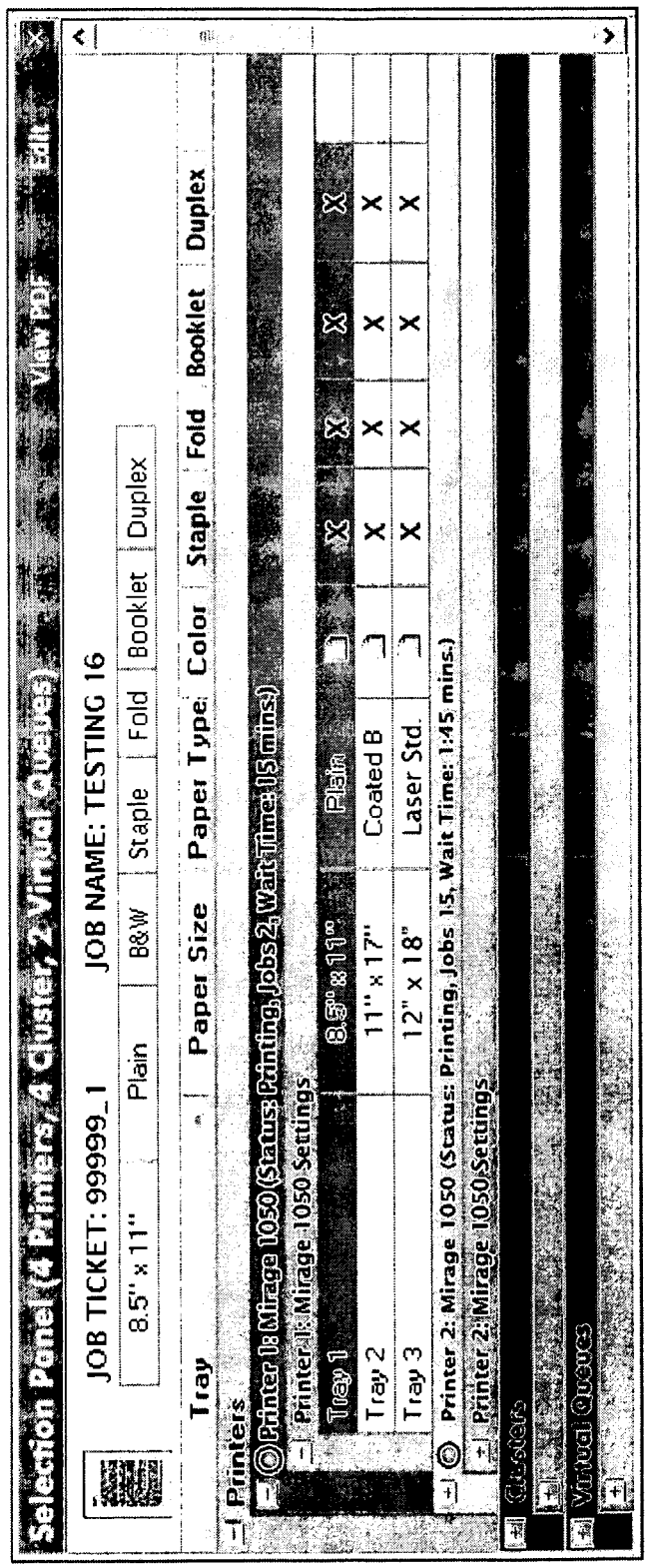
FIG. 13 schematically illustrates an example a Selection Panel according to an embodiment of the present invention.

FIG. 13 illustrates an example of the Selection Panel. At the top header row of the panel, the name of the panel, "Selection Panel" appears along with the number of Printers, Clusters, and Virtual Queues that are connected to the server. Just below the header row is shown information on the Job Ticket, indicating the job ticket number and the job name as well as the paper size, paper type, color and finishing options specified by the print job. As the print job parameters for the finishing options, this example designates Staple, Fold, Booklet and Duplex.

The rest of the panel is also designed in a manner similar to the Queue Panel and the View Recommends Panel discussed above. The panel lists printing devices (Printers, Clusters, Virtual Queues) along with their printer settings and indicates how these printer settings conform to the job parameter values specified in the print job. In the example of FIG. 13, each row of the paper tray indicates the paper size, the paper type, and the color of paper in the tray as well as information on whether paper fed from that paper tray can be processed by the following finishing options: Staple, Fold, Booklet, and Duplex. For example the "X" mark under Staple column indicates that the Staple finishing is available.

In this example, Printer 1 and its Try 1 are highlighted in green, indicating that the printer settings perfectly match the print job requested. Indeed, it can be seen that the job parameter values of this print job, listed on the top of the Panel, match the respective printer settings listed for Tray 1 of Printer 1.

The size of the Selection Panel window is designed such that when the panel initially opens, the recommended printing devices are shown in the window. FIG. 13 shows the highlighted Printer 1 on the top, followed by Printer 2 and collapsed entries of Clusters and Virtual Queues. The Selection Panel of this example, however, contains all the printing devices (Printers, Clusters, Virtual Queues) connected to the server so that the status and other information, discussed with reference to Queue Panels above, of each of these devices are also accessible through this Panel by the user. By scrolling down the window and/or expanding the window, the user can access these printing devices and review the content.

The printing devices that do not qualify as recommended devices are collapsed to show only their names (or their type if there is no much in an entire type of printing devices) to save the space. In FIG. 13, there is no recommended printing device in Clusters and Virtual Queues. Therefore, only the names of the device type (Clusters and Virtual Queues) appear in the Selection Panel. If a user wishes to see the printer settings of these devices, the user can click on the device type name and then on a printing device name to expand the view.

As in the Queue and View Recommends Panels, the Selection Panel also lists the status of the printing devices. Based on the information displayed on the Selection Panel, a user can readily decide what printing device to use for processing the print job. For example, if there are more than one exact matching printing devices, the operator may pick a device that has a shorter waiting time. Further, using an appropriate algorithm, the server may be configured to refer to the status information of these printing devices and automatically determine the best matching printing device for presenting to the user.

In the above descriptions, the term "black and white" includes gray scales if the black and white printers are capable of printing gray scale images (e.g. using half-toning or some other suitable method).

While the embodiments have been described as being applied in a print shop environment, the invention is not limited to any physical setting of a shop or network, and can be applied to a print shop system having a distributed setting where printers at different locations are connected to a server. In particular, it should be apparent that one or more of the components of the print shop system can communicate with the rest of the system via virtual private network (VPN) or similar means through the Internet. Moreover, referring to FIG. 1, although the server 4 of the above examples functions as the print job management server as well as the network server, a separate stand-alone computer may be provided to run the print job management software. In the alternative, when properly configured, one of the client computers 1 and 2 or the computers attached to one of the printers 5-9 (if such a printer exists among them) may be used to assume the role of the print job management server. Further, although a Windows based server computer with appropriate software has been described above as an example, a print management system of the present invention can be implemented in a proprietary hardware system that is specifically designed to perform the above-described various functionalities of the print management system.

It will be apparent to those skilled in the art that various modification and variations can be made in the print job analyzing method and apparatus of the present invention without departing from the spirit or scope of the invention. Thus, it is intended that the present invention cover modifications and variations that come within the scope of the appended claims and their equivalents.

What is claimed is:

1. A method implemented in a print job management apparatus connected to a plurality of printers, each of the plurality of printers having printer settings, the method comprising:
   receiving a plurality of print jobs, each print job specifying values of job parameters;
   displaying the plurality of print jobs in a list;
   in response to a selection of one of the displayed print jobs by an operator, reading out values of the job parameters specified in the selected print job;
   determining whether any of the printer settings of the plurality of printers conform to said read out values of the job parameters of the selected print job; and
   communicating a result of the conformity determination to a user, including displaying a list of printers that have one or more printer settings which conform to said read out values of the job parameters of the selected print job as recommended printers, including:
      visually presenting the list of printers and printer settings of each printer in the list of printers; and
      visually distinguishing, among the printer settings visually presented, any printer setting that conforms to the value of the corresponding job parameter of the selected print job.

2. The method of claim 1, wherein the job parameters for which the values are specified in each one of the plurality of the print jobs include a size, a type and a color of paper on which said print job is to be processed and finishing options, and wherein for each of the plurality of printers, the printer settings are a size, a type of paper, color printing capability of the printer, and finishing options that can be processed by the printer for each of input paper trays of the printer.

3. The method of claim 1, wherein said list visually indicates a printer status of each printer in the list of printers.

4. The method of claim 3, wherein the printer status includes an operating status, the number of print jobs in a corresponding print queue, and a waiting time.

5. The method of claim 1, wherein said list includes all of the plurality of printers connected to the print job management apparatus together with the printer settings of each of the plurality of printers.

6. The method of claim 1, further comprising receiving a user input indicating one of the recommended printers for processing the selected print job.

7. A computer program product comprising a computer usable non-transitory medium having a computer readable code embodied therein for controlling a data processing apparatus connected to a plurality of printers, each of the plurality of printers having printer settings, the computer readable program code being configured to cause the data processing apparatus to execute a process for analyzing a plurality of print jobs, the process comprising:

receiving a plurality of print jobs, each print job specifying values of job parameters;

displaying the plurality of print jobs in a list;

in response to a selection of one of the displayed print jobs by an operator, reading out values of the job parameters specified in the selected print job;

determining whether any of the printer settings of the plurality of printers conform to said read out values of the job parameters of the selected print job; and communicating a result of the conformity determination to a user, including displaying a list of printers that have one or more printer settings which conform to said read out values of the job parameters of the selected print job as recommended printers, including:

visually presenting the list of printers and printer settings of each of printer in the list of printers; and visually distinguishing, among the printer settings visually presented, any printer setting that conforms to the value of the corresponding job parameter of the selected print job.

8. The computer program product of 7, wherein the conformity determination step in said process includes analyzing the printer settings of each of the plurality of printers and the values of the job parameters of the selected print job, and when all of the printer settings of a printer or a combination of printers respectively match the values of the corresponding job parameters specified in the selected print job, determining such a matching printer or combination of printers as a recommended printing device, and wherein the step of visually communicating the result of the conformity determination includes causing a graphic user interface connected to the data processing apparatus to make user-accessible a list of all of the plurality of printers connected to the data processing apparatus together with the printer settings of each of the plurality of printers; and causing the graphic user interface to visually distinguish said recommended printing device.

9. A print job analyzing apparatus configured to be connected to a plurality of printers each of the plurality of printers having printer settings, the print job analyzing apparatus comprising:

a data processor communicating with a graphic user interface, the data processor receiving a plurality of print jobs each specifying values of job parameters and displaying the plurality of print jobs in a list, the data processor receiving an operator selection of one of the print jobs and reading out values of the job parameters specified in the selected print job, and determining whether any of the printer settings of the plurality of printers conform to said read out values of the job parameters of the selected print job, the data processor causing the graphic user interface to communicate a result of the conformity determination to the user including displaying a list of printers that have one or more printer settings which conform to said read out values of the job parameters of the selected print job as recommended printers, including:

visually presenting the list of printers and printer settings of each printer in the list of printers, and visually distinguishing, among the printer settings visually presented, any printer setting that conforms to the value of the corresponding job parameter of the selected print job.

* * * * *